US011140684B2

(12) United States Patent
Lyu et al.

(10) Patent No.: US 11,140,684 B2
(45) Date of Patent: Oct. 5, 2021

(54) DATA TRANSMISSION METHOD AND APPARATUS

(71) Applicant: Huawei Technologies Co., Ltd., Shenzhen (CN)

(72) Inventors: Yongxia Lyu, Ottawa (CA); Ruixiang Ma, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 158 days.

(21) Appl. No.: 16/577,586

(22) Filed: Sep. 20, 2019

(65) Prior Publication Data

US 2020/0015233 A1    Jan. 9, 2020

Related U.S. Application Data

(63) Continuation of application No. PCT/CN2018/080047, filed on Mar. 22, 2018.

(30) Foreign Application Priority Data

Mar. 24, 2017  (CN) .......................... 201710184044.8

(51) Int. Cl.
*H04W 72/04* (2009.01)
*H04L 1/00* (2006.01)
*H04W 28/02* (2009.01)

(52) U.S. Cl.
CPC ....... *H04W 72/0466* (2013.01); *H04L 1/0005* (2013.01); *H04L 1/0058* (2013.01); *H04W 28/0278* (2013.01)

(58) Field of Classification Search
CPC ......... H04W 72/0466; H04W 28/0278; H04W 72/1284; H04W 72/0446; H04L 1/0005;
(Continued)

(56) References Cited

U.S. PATENT DOCUMENTS 8,885,526 B2    11/2014  He et al.
2009/0163211 A1*  6/2009  Kitazoe ............. H04W 74/0866
                                                   455/436
(Continued)

FOREIGN PATENT DOCUMENTS

CN        101904213 A     12/2010
CN        102918881 A      2/2013
(Continued)

OTHER PUBLICATIONS

Ericsson,"Buffer Status Report Calculation",TSG-RAN WG2 Meeting #60bis R2-080298,Sevilla, Spain, Jan. 5-9, 2008,total 5 pages.
(Continued)

*Primary Examiner* — Ivan O Latorre
(74) *Attorney, Agent, or Firm* — Slater Matsil, LLP

(57) ABSTRACT

This application provides a data transmission method and apparatus. The method includes coding, by a terminal device, a first transport block to obtain a first coded transport block, where the first transport block includes first data; coding, by the terminal device, indication information to obtain coded indication information, where the indication information is used to indicate whether the terminal device sends a first buffer status report BSR when the terminal device sends the first data, and the first BSR indicates a data amount of to-be-transmitted data currently buffered in a buffer of the terminal device; and sending, by the terminal device, the first coded transport block and the coded indication information to a network device. According to the data transmission method and apparatus provided in embodiments of this application, the network device can directly learn whether the terminal device sends a BSR, so as to reduce a communication delay.

15 Claims, 3 Drawing Sheets

(58) Field of Classification Search
CPC ....... H04L 1/0058; H04L 1/18; H04L 1/0027; H04L 1/0032; H04L 1/1812
See application file for complete search history.

(56) References Cited

U.S. PATENT DOCUMENTS

| | | | |
|---|---|---|---|
| 2010/0035565 A1* | 2/2010 | Baker | H04B 7/0697 455/101 |
| 2010/0290412 A1* | 11/2010 | Ahn | H04L 47/38 370/329 |
| 2011/0009116 A1* | 1/2011 | Moberg | H04W 24/10 455/425 |
| 2011/0085566 A1* | 4/2011 | Bucknell | H04L 47/33 370/412 |
| 2011/0194641 A1* | 8/2011 | Lim | H04L 27/2602 375/295 |
| 2012/0051255 A1* | 3/2012 | Han | H04W 24/10 370/252 |
| 2013/0089057 A1 | 4/2013 | Worrall et al. | |
| 2013/0188590 A1* | 7/2013 | Aiba | H04W 72/04 370/329 |
| 2015/0230082 A1 | 8/2015 | Li | |
| 2015/0334737 A1* | 11/2015 | Susitaival | H04W 24/02 370/329 |
| 2017/0071010 A1 | 3/2017 | Lim et al. | |
| 2018/0048498 A1* | 2/2018 | Stern-Berkowitz | H04L 5/0048 |
| 2018/0375621 A1* | 12/2018 | Turtinen | H04L 1/1816 |
| 2019/0158249 A1* | 5/2019 | Harada | H04W 72/14 |
| 2019/0373619 A1* | 12/2019 | Liu | H04W 52/367 |

FOREIGN PATENT DOCUMENTS

| | | |
|---|---|---|
| CN | 103781123 A | 5/2014 |
| CN | 103945553 A | 7/2014 |
| CN | 103974338 A | 8/2014 |
| CN | 104170279 A | 11/2014 |
| CN | 105188150 A | 12/2015 |
| CN | 105282850 A | 1/2016 |
| EP | 2946516 B1 | 10/2018 |
| WO | 2009136830 A1 | 11/2009 |
| WO | 2016126346 A1 | 8/2016 |

OTHER PUBLICATIONS

Nokia,"Buffer Reporting for E-UTRAN",3GPP TSG-RAN WG2 Meeting #52 R2-060829, Mar. 27-31, 2006,total 5 pages.

Huawei et al.,"BSR for Two-stage scheduling",3GPP TSG-RAN WG2 Meeting #96 R2-167693,Reno, USA, Nov. 14-18, 2016,total 3 pages.

Ericsson,"Uplink scheduling for NR",3GPP TSG-RAN WG2#95 Tdoc R2-165341,Gothenburg, Sweden, Aug. 22-26, 2016,total 4 pages.

* cited by examiner

DATA TRANSMISSION METHOD AND APPARATUS

CROSS-REFERENCE TO RELATED APPLICATIONS

This application is a continuation of International Application No. PCT/CN2018/080047, filed on Mar. 22, 2018, which claims priority to Chinese Patent Application No. 201710184044.8, filed on Mar. 24, 2017. The disclosures of the aforementioned applications are hereby incorporated by reference herein in their entireties.

TECHNICAL FIELD

This application relates to the communications field, and more specifically, to a data transmission method and apparatus in the communications field.

BACKGROUND

In a wireless communications system, all user equipments (UEs) establishing a connection to a network device share an air interface resource, in other words, the network device shares an air interface resource in each transmission time interval (TTI). To be specific, the network device dynamically allocates a transmission resource to UE of the network device in each TTI based on information such as a data amount of the UE, so as to increase channel utilization.

During uplink data scheduling, the UE reports a buffered data amount of the UE to the network device by sending a buffer status report (BSR), to provide reference for the uplink scheduling by the network device. The network device allocates an uplink transmission resource to the UE based on a current available resource, and BSRs and other information of all UEs.

In an existing method for reporting a BSR by UE, the UE reports the BSR to a network device by using a media access control (MAC) control element (CE). Specifically, a MAC protocol data unit (PDU) including logical channel data and MAC CEs is used as a transport block (TB) at a MAC layer, the transport block is coded to obtain a coded transport block, and then the coded transport block is sent to the network device. Correspondingly, after receiving the coded transport block, the network device needs to decode the coded transport block to learn whether the MAC protocol data unit sent by the UE carries the BSR, and allocates an uplink resource to the UE based on the BSR. Consequently, a communication delay is relatively high.

SUMMARY

This application provides a data transmission method and apparatus, so that a network device can learn whether a terminal device sends a BSR, thereby reducing a communication delay.

According to a first aspect, this application provides a data transmission method, where the method includes:

coding, by a terminal device, a first transport block to obtain a first coded transport block, where the first transport block includes first data;

coding, by the terminal device, indication information to obtain coded indication information, where the indication information is used to indicate whether the terminal device sends a first buffer status report BSR when the terminal device sends the first data, and the first BSR indicates a data amount of to-be-transmitted data currently buffered in a buffer of the terminal device; and sending, by the terminal device, the first coded transport block and the coded indication information to a network device.

It should be understood that the terminal device reports the first BSR to the network device. The first BSR is used to indicate an amount of data that is in the buffer of the terminal device other than the first data and that remains to be sent, namely, the data amount of the to-be-transmitted data buffered in the buffer, so that after receiving the first BSR, the network device allocates a time-frequency resource to the terminal device based on the data amount reported by using the first BSR.

In the data transmission method provided in this embodiment of this application, the terminal device separately codes the indication information and the first transport block to obtain the coded indication information and the first coded transport block, and sends the coded indication information and the first coded transport block to the network device. The first transport block carries the first data, the indication information is used to indicate whether the terminal device sends the first BSR when the terminal device sends the first data. After receiving the coded indication information, the network device decodes the coded indication information to learn whether the terminal device sends the first BSR, so as to reduce a communication delay.

In a possible implementation, before the coding, by a terminal device, a first transport block to obtain a first coded transport block, the method further includes: processing, by the terminal device, a second transport block to obtain a second coded transport block, where the second transport block includes the first data and a second BSR, and the second BSR indicates a data amount of to-be-transmitted data in the buffer when the terminal device sends the second coded transport block; and sending, by the terminal device, the second coded transport block to the network device.

It should be understood that, when the terminal device sends the first coded transport block, and the first coded transport block includes the first data, it may be understood that the terminal device initially transmits the first data, or the terminal device retransmits the first data. This is not limited in this embodiment of this application.

Optionally, before the terminal device sends the first coded transport block, the terminal device may send the second coded transport block. The second coded transport block includes the first data. When both the second coded transport block and the first coded transport block include the first data, it may be understood that a transmission process in which the terminal device sends the second coded transport block is a process of initially transmitting the first data, and a transmission process in which the terminal device sends the first coded transport block is a process of retransmitting the first data. This is not limited in this embodiment of this application.

In the data transmission method provided in this embodiment of this application, if the indication information is used to indicate that the terminal device does not send the first BSR when the terminal device sends the first data, the network device can jointly decode the first coded transport block and the second coded transport block based on the indication information. If the indication information is used to indicate that the terminal device sends the first BSR when the terminal device sends the first data, the network device separately decodes the first coded transport block and the second coded transport block, so as to avoid a case in which the network device does not learn that the first coded transport block carries the first BSR, and jointly decodes the first coded transport block and the second coded transport block, and consequently a decoding failure is caused.

In a possible implementation, the indication information is used to indicate that the terminal device sends the first BSR when the terminal device sends the first data and that the second BSR is updated with the first BSR.

Optionally, when the second coded transport block includes only the first data, and does not include the second BSR, it indicates that the terminal device reports no BSR when the terminal device initially transmits the first data. When the second coded transport block includes both the first data and the second BSR, it indicates that the terminal device reports a BSR when the terminal device initially transmits the first data.

Optionally, if the terminal device reports the second BSR when the terminal device initially transmits the first data, the indication information is further used to indicate that the terminal device reports the first BSR when the terminal device retransmits the first data and that the second BSR reported when the first data is initially transmitted needs to be updated with the first BSR.

In the data transmission method provided in this embodiment of this application, if the indication information is used to indicate that the terminal device sends the first BSR when the terminal device sends the first data and that the second BSR is updated with the first BSR, the network device can obtain the first BSR through updating based on the indication information, and allocate a time-frequency resource to the terminal device based on the first BSR obtained through updating, so as to prevent the terminal device from requesting a new resource for data corresponding to the first BSR, thereby reducing a communication delay, and avoiding a case in which the network device does not learn whether the terminal device sends the first BSR when the terminal device sends the first coded transport block, and jointly decodes the first coded transport block and the second coded transport block by using an existing method, and consequently the two coded transport blocks are incorrectly decoded, in other words, the first BSR that is obtained through updating and that is carried in the first coded transport block cannot be obtained through decoding, and consequently a resource cannot be allocated to the terminal device based on the first BSR.

In a possible implementation, the first transport block further includes the first BSR.

In a possible implementation, the indication information is used to indicate that the terminal device sends the first BSR when the terminal device sends the first data, and the method further includes: coding, by the terminal device, a third transport block to obtain a third coded transport block, where the third transport block includes the first BSR; and sending, by the terminal device, the third coded transport block to the network device.

Optionally, the indication information is used to indicate that the terminal device sends the first BSR when the terminal device sends the first data, and the terminal device may report the first BSR to the network device in a plurality of manners. This is not limited in this embodiment of this application.

In an optional embodiment, the terminal device may code the first transport block to obtain the first coded transport block, and the first transport block includes the first data and the first BSR.

In another optional embodiment, the terminal device may separately code the first transport block and the third transport block to obtain the first coded transport block and the third coded transport block, the first transport block includes the first data, and the third transport block includes the first BSR.

In the data transmission method provided in this embodiment of this application, the terminal device separately codes and transmits the first BSR and the first data, and a coding level of the first BSR is lower than a coding level of the first data, so as to improve BSR transmission reliability.

In still another optional embodiment, the terminal device may send the first BSR that is used as a control channel to the network device.

In a possible implementation, the first transport block and the third transport block are coded by using different modulation and coding schemes, or the first transport block and the third transport block are coded by using a same modulation and coding scheme.

It should be understood that the first BSR sent by the terminal device affects allocation of a time-frequency resource by the network device to the terminal device. Therefore, when the terminal device codes the first BSR, reliability of the first BSR needs to be ensured.

In an optional embodiment, the first transport block and the third transport block may be coded by using different modulation and coding schemes MCSs, to be specific, the third transport block may be coded by using an MCS different from an MCS for the first transport block that is indicated by an uplink scheduling grant or predefined in a grant-free manner.

In another optional embodiment, the first transport block and the third transport block may be coded by using a same modulation and coding scheme MCS, to be specific, both the first transport block and the third transport block may be coded by using a first MCS indicated by an uplink scheduling grant or predefined in a grant-free manner.

In still another optional embodiment, the first coded transport block and the third coded transport block may be sent by using different transmit power, to be specific, the third coded transport block may be sent by using transmit power different from transmit power indicated by an uplink scheduling grant or predefined in a grant-free manner.

In a possible implementation, the sending, by the terminal device, the third coded transport block to the network device includes: sending, by the terminal device, the third coded transport block on a time-frequency resource pre-allocated by the network device.

It should be understood that before the terminal device sends the first coded transport block to the network device, the terminal device may receive scheduling information sent by the network device. The scheduling information is used to indicate a time-frequency resource used by the terminal device to transmit the first data.

Optionally, the terminal device may send the first coded transport block by using the time-frequency resource indicated by the network device. This is not limited in this embodiment of this application.

According to a second aspect, this application provides another data transmission method, where the method includes:

receiving, by a network device, a first coded transport block and coded indication information that are sent by a terminal device, where the first coded transport block includes first data;

decoding, by the network device, the coded indication information to obtain indication information, where the indication information is used to indicate whether the terminal device sends a first buffer status report BSR when the terminal device sends the first data, and the first BSR indicates a data amount of to-be-transmitted data currently buffered in a buffer of the terminal device; and processing, by the network device, the first coded transport block based on the indication information.

It should be understood that the terminal device reports the first BSR to the network device. The first BSR is used to indicate an amount of data that is in the buffer of the terminal device other than the first data and that remains to be sent, namely, the data amount of the to-be-transmitted data buffered in the buffer, so that after receiving the first BSR, the network device allocates a time-frequency resource to the terminal device based on the data amount reported by using the first BSR.

In a possible implementation, before the receiving, by a network device, a first coded transport block and coded indication information that are sent by a terminal device, the method further includes: receiving, by the network device, a second coded transport block sent by the terminal device, where the second coded transport block includes the first data and a second BSR, and the second BSR indicates a data amount of to-be-transmitted data in the buffer when the terminal device sends the first data.

It should be understood that, when the terminal device sends the second coded transport block, it may be understood that the terminal device initially transmits the first data, or when the terminal device sends the second coded transport block, it may be understood that the terminal device retransmits the first data. The first transport block and the second transport block include at least the same first data.

Optionally, the second transport block further includes the second BSR. If the indication information is used to indicate that the terminal device sends the first BSR when the terminal device sends the first data, in other words, when the terminal device retransmits the first data, the data amount in the buffer of the terminal device increases, the terminal device needs to immediately report the data amount of the to-be-transmitted data currently buffered in the buffer.

It should be understood that the terminal device may determine, based on quality of service (QoS) of the to-be-transmitted data in the buffer, whether a BSR in the buffer needs to be immediately reported. For example, for a data service for which a delay needs to be lower than 0.5 ms or a service for which a delay needs to be lower than n ms, the terminal device immediately reports a buffer status.

In the data transmission method provided in this embodiment of this application, if the indication information is used to indicate that the terminal device does not send the first BSR when the terminal device sends the first data, the network device can jointly decode the first coded transport block and the second coded transport block based on the indication information. If the indication information is used to indicate that the terminal device sends the first BSR when the terminal device sends the first data, the network device separately decodes the first coded transport block and the second coded transport block, so as to avoid a case in which the network device does not learn that the first coded transport block carries the first BSR, and jointly decodes the first coded transport block and the second coded transport block, and consequently a decoding failure is caused.

In a possible implementation, the indication information is further used to indicate that the second BSR is updated with the first BSR, and the method further includes: updating, by the network device, the second BSR with the first BSR.

In a possible implementation, the indication information is used to indicate that the terminal device sends the first BSR when the terminal device sends the first data, and the method further includes: receiving, by the network device, a third coded transport block sent by the terminal device; and decoding, by the network device, the third coded transport block to obtain the first BSR.

In a possible implementation, the first coded transport block and the third coded transport block are separately decoded.

It should be understood that the first BSR sent by the terminal device affects allocation of a time-frequency resource by the network device to the terminal device. Therefore, when the terminal device codes the first BSR, reliability of the first BSR needs to be ensured.

In a possible implementation, the receiving, by the network device, a third coded transport block sent by the terminal device includes: receiving, by the network device, the third coded transport block on a time-frequency resource pre-allocated to the terminal device.

In a possible implementation, the indication information is used to indicate that the terminal device sends the first BSR when the terminal device sends the first data, and the processing, by the network device, the first coded transport block based on the indication information includes: separately decoding, by the network device, the first coded transport block and the second coded transport block based on the indication information.

In a possible implementation, the indication information is used to indicate that the terminal device does not send the first BSR when the terminal device sends the first data, and the processing, by the network device, the first coded transport block based on the indication information includes: jointly decoding, by the network device, the first coded transport block and the second coded transport block based on the indication information.

In the data transmission method provided in this embodiment of this application, the network device may decode the coded indication information to learn whether the terminal device sends the first BSR when the terminal device sends the first data. Further, when the indication information is used to indicate that the first BSR is sent, the network device may decode the third coded transport block to obtain the first BSR (or the second BSR is updated with the first BSR), so as to allocate the time-frequency resource to the terminal device based on the first BSR, thereby reducing a communication delay.

According to a third aspect, this application provides still another data transmission method, where the method includes:

coding, by a terminal device, a first transport block to obtain a first coded transport block, where the first transport block includes first data;

determining, by the terminal device based on whether a first buffer status report BSR is sent when the first data is sent, a manner of transmitting the first coded transport block, where the first BSR indicates a data amount of to-be-transmitted data currently buffered in a buffer of the terminal device; and sending, by the terminal device, the first coded transport block to the network device based on the transmission manner.

In the data transmission method provided in this embodiment of this application, the terminal device may determine, based on whether the first BSR is sent when the first data is sent, the manner of transmitting the first coded transport block, and send the first coded transport block to the network device based on the transmission manner, so that the indication information can be implicitly sent to the network device without occupying a time-frequency resource allocated by the network device to the terminal device, thereby saving network resources.

In a possible implementation, the determining, by the terminal device based on whether a first buffer status report BSR is sent when the first data is sent, a manner of transmitting the first coded transport block includes: determining, by the terminal device based on whether the first BSR is sent when the first data is sent, a time-frequency resource used for the first coded transport block.

In a possible implementation, the determining, by the terminal device based on whether a first buffer status report BSR is sent when the first data is sent, a manner of transmitting the first coded transport block includes: determining, by the terminal device based on whether the first BSR is sent when the first data is sent, a pilot sequence used for the first coded transport block.

According to a fourth aspect, this application provides yet another data transmission method, where the method includes:

receiving, by a network device, a first coded transport block sent by a terminal device, where the first coded transport block includes first data;

determining, by the network device based on a manner of transmitting the first coded transport block, whether the terminal device sends a first buffer status report BSR when the terminal device sends the first data, where the first BSR indicates a data amount of to-be-transmitted data currently buffered in a buffer of the terminal device; and processing, by the network device, the first coded transport block based on whether the terminal device sends the first BSR when the terminal device sends the first data.

In the data transmission method provided in this embodiment of this application, the terminal device may determine, based on whether the first BSR is sent when the first data is sent, the manner of transmitting the first coded transport block, and send the first coded transport block to the network device based on the transmission manner, so that the indication information can be implicitly sent to the network device without occupying a time-frequency resource allocated by the network device to the terminal device, thereby saving network resources.

In a possible implementation, the determining, by the network device based on a manner of transmitting the first coded transport block, whether the terminal device sends a first buffer status report BSR when the terminal device sends the first data includes: determining, by the network device based on a time-frequency resource used for the first coded transport block, whether the terminal device sends the first BSR when the terminal device sends the first data.

In a possible implementation, the determining, by the network device based on a manner of transmitting the first coded transport block, whether the terminal device sends a first buffer status report BSR when the terminal device sends the first data includes: determining, by the network device based on a pilot sequence used for the first coded transport block, whether the terminal device sends the first BSR when the terminal device sends the first data.

According to a fifth aspect, this application provides a data transmission apparatus, configured to perform the method in the first aspect or each implementation of the first aspect. Specifically, the apparatus includes units configured to perform the method in the first aspect or each implementation of the first aspect.

According to a sixth aspect, this application provides another data transmission apparatus, configured to perform the method in the second aspect or each implementation of the second aspect. Specifically, the apparatus includes units configured to perform the method in the second aspect or each implementation of the second aspect.

According to a seventh aspect, this application provides still another data transmission apparatus, configured to perform the method in the third aspect or each implementation of the third aspect. Specifically, the apparatus includes units configured to perform the method in the third aspect or each implementation of the third aspect.

According to an eighth aspect, this application provides yet another data transmission apparatus, configured to perform the method in the fourth aspect or each implementation of the fourth aspect. Specifically, the apparatus includes units configured to perform the method in the fourth aspect or each implementation of the fourth aspect.

According to a ninth aspect, this application provides still yet another data transmission apparatus, including a processor and a transceiver, where the processor performs the method in the first aspect or each implementation of the first aspect based on the transceiver.

According to a tenth aspect, this application provides a further data transmission apparatus, including a processor and a transceiver, where the processor performs the method in the second aspect or each implementation of the second aspect based on the transceiver.

According to an eleventh aspect, this application provides a still further data transmission apparatus, including a processor and a transceiver, where the processor performs the method in the third aspect or each implementation of the third aspect based on the transceiver.

According to a twelfth aspect, this application provides a yet further data transmission apparatus, including a processor and a transceiver, where the processor performs the method in the fourth aspect or each implementation of the fourth aspect based on the transceiver.

According to a thirteenth aspect, this application provides a computer program product including an instruction, where when the computer program product runs on a computer, the computer performs the method in the first aspect or each implementation of the first aspect.

According to a fourteenth aspect, this application provides a computer program product including an instruction, where when the computer program product runs on a computer, the computer performs the method in the second aspect or each implementation of the second aspect.

According to a fifteenth aspect, this application provides a computer program product including an instruction, where when the computer program product runs on a computer, the computer performs the method in the third aspect or each implementation of the third aspect.

According to a sixteenth aspect, this application provides a computer program product including an instruction, where when the computer program product runs on a computer, the computer performs the method in the fourth aspect or each implementation of the fourth aspect.

According to a seventeenth aspect, this application provides a computer readable medium, configured to store a computer program, where the computer program includes an instruction used to perform the method in the first aspect or each implementation of the first aspect.

According to an eighteenth aspect, this application provides a computer readable medium, configured to store a computer program, where the computer program includes an instruction used to perform the method in the second aspect or each implementation of the second aspect.

According to a nineteenth aspect, this application provides a computer readable medium, configured to store a computer program, where the computer program includes an instruction used to perform the method in the third aspect or each implementation of the third aspect.

According to a twentieth aspect, this application provides a computer readable medium, configured to store a computer program, where the computer program includes an instruction used to perform the method in the fourth aspect or each implementation of the fourth aspect.

DETAILED DESCRIPTION OF ILLUSTRATIVE EMBODIMENTS

The following describes technical solutions of this application with reference to accompanying drawings.

Figure 1:
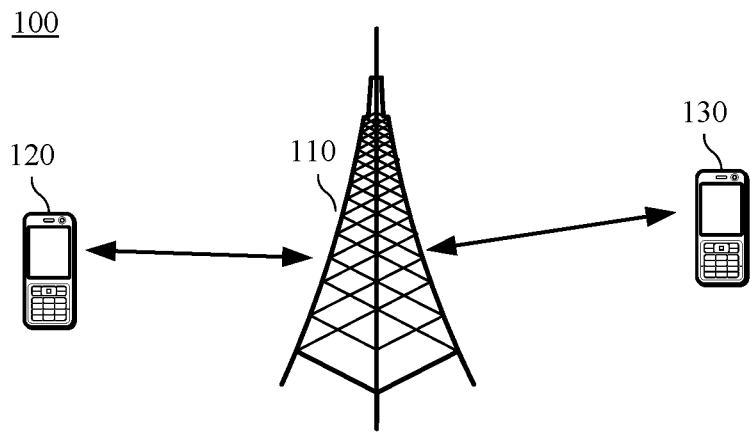
FIG. 1 is a schematic architectural diagram of a wireless communications system to which an embodiment of this application is applied.

FIG. 1 shows a wireless communications system 100 to which an embodiment of this application is applied. The wireless communications system 100 may include at least one network device, and FIG. 1 shows a network device 110. The network device no may provide communication coverage for a specific geographical area, and may communicate with a terminal device in the coverage area. The network device no may be a base transceiver station (BTS) in a GSM system or a CDMA system, may be a NodeB (NB) in a WCDMA system, may be an evolved NodeB (eNB or eNodeB) in an LTE system, or may be a radio controller in a cloud radio access network (CRAN). Alternatively, the network device may be a relay station, an access point, a vehicle-mounted device, a wearable device, a network-side device in a future 5G network, a network device in a future evolved public land mobile network (PLMN), or the like.

The wireless communications system 100 further includes a plurality of terminal devices in a coverage area of the network device 110, and FIG. 1 shows a terminal device 120 and a terminal device 130.

FIG. 1 shows one network device and two terminal devices as an example. Optionally, the wireless communications system 100 may include a plurality of network devices, and a coverage area of each network device may include another quantity of terminal devices. This is not limited in this embodiment of this application. Optionally, the wireless communications system 100 may further include another network entity such as a network controller or a mobility management entity. This is not limited in this embodiment of this application.

It should be understood that a terminal device may be mobile or fixed. The first terminal device 120 and the second terminal device 130 may be an access terminal, UE, a subscriber unit, a subscriber station, a mobile station, a mobile console, a remote station, a remote terminal, a mobile device, a user terminal, a terminal, a wireless communications device, a user agent, a user apparatus, or the like. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved PLMN, or the like.

In this embodiment of this application, a TTI represents a time interval of one-time data transmission, and is also a minimum scheduling period. A data block transmitted by a communications device in one TTI is referred to as a TB, and a code block (CB) may be obtained by modulating and coding the transport block in the TTI.

In the prior art, after first data arrives, a terminal device sends a resource request to a network device, and the resource request may be a dedicated scheduling request or a random access preamble sequence. After receiving the resource request, the network device allocates a time-frequency resource to the terminal device, and sends an uplink scheduling instruction to the terminal device. After the terminal device receives the uplink scheduling instruction, if there is no to-be-transmitted data in a buffer of the terminal device, the terminal device uses the first data as a transport block, modulates and codes the transport block to obtain a coded transport block, and sends the coded transport block by using the time-frequency resource allocated by the network device. Alternatively, after the terminal device receives the uplink scheduling instruction, if there is to-be-transmitted data in a buffer of the terminal device, the terminal device uses the first data and a BSR as a transport block, modulates and codes the transport block to obtain a coded transport block, and sends the coded transport block to the network device by using the time-frequency resource allocated by the network device. The BSR indicates a data amount of the to-be-transmitted data in the buffer of the terminal device. Correspondingly, after receiving the data packet, the network device needs to decode the data packet to learn whether the BSR is reported. If the BSR is sent, the network device allocates a time-frequency resource to the to-be-transmitted data in the buffer based on the BSR, and sends an uplink scheduling instruction for the to-be-transmitted data to the terminal device. If the BSR is not sent, the network device decodes the coded transport block to obtain the first data.

In other words, in the prior art, the network device needs to decode the received coded transport block to learn whether the terminal device reports the BSR. Consequently, a communication delay is relatively high.

According to a data transmission method and apparatus provided in the embodiments of this application, the network device can directly learn whether the terminal device sends a BSR, so as to reduce a communication delay.

In addition, a prior-art BSR reporting method is applicable only to a scenario of initially transmitting the first data. If second data arrives at the terminal device (for example, the second data is data of an ultra-reliable low latency communications (URLLC) service) when the first data is retransmitted, according to the existing BSR reporting method, a BSR of the second data in the buffer that newly arrives cannot be reported in a process of retransmitting the first data. Therefore, a request for scheduling the second data can be made only after the first data is transmitted. Consequently, a communication delay is relatively high.

According to the data transmission method and apparatus provided in the embodiments of this application, the terminal device can report a BSR to the network device when the terminal device retransmits data, so as to reduce a communication delay.

It should be understood that in the data transmission method in the embodiments of this application, the terminal device may have a network function, and the network device may have a terminal function, to be specific, the data transmission method in the embodiments of this application may be applied to communication between any two communications devices (for example, between two terminal devices, between two network devices, or between a terminal device and a network device) in the wireless communications system shown in FIG. 1. In this application, only communication between a terminal device and a network device is used as an example for description. However, the embodiments of this application are not limited thereto.

Figure 2:
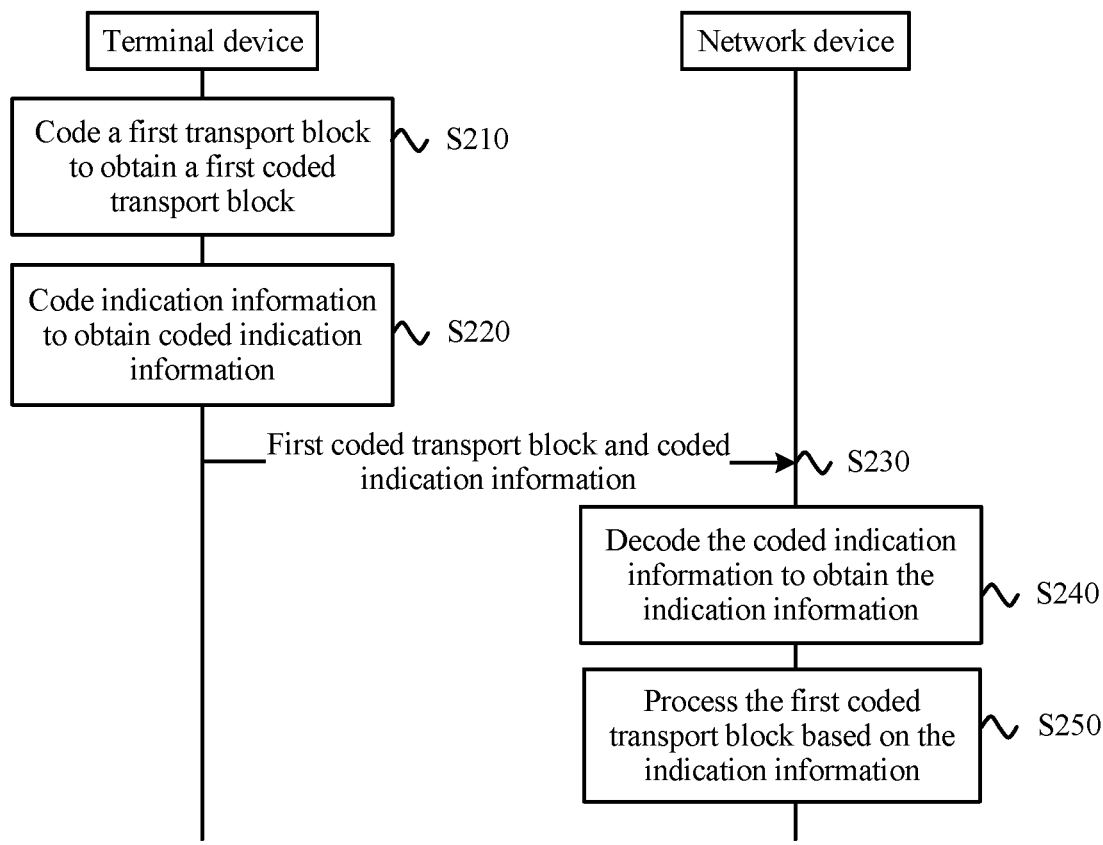
FIG. 2 is a schematic flowchart of a data transmission method according to an embodiment of this application.

FIG. 2 is a schematic flowchart of a data transmission method 200 according to an embodiment of this application. The method 200 may be applied to the wireless communications system shown in FIG. 1.

S210. A terminal device codes a first transport block to obtain a first coded transport block, where the first transport block includes first data.

S220. The terminal device codes indication information to obtain coded indication information, where the indication information is used to indicate whether the terminal device sends a first buffer status report BSR when the terminal device sends the first data, and the first BSR indicates a data amount of to-be-transmitted data currently buffered in a buffer of the terminal device.

S230. The terminal device sends the first coded transport block and the coded indication information to the network device, and correspondingly, the network device receives the first coded transport block and the coded indication information that are sent by the terminal device.

S240. The network device decodes the coded indication information to obtain the indication information.

S250. The network device processes the first coded transport block based on the indication information.

It should be understood that a sequence of performing S210 and S220 is not limited in this embodiment of this application.

Specifically, the terminal device may separately code the first transport block and the indication information to obtain the first coded transport block and the coded indication information, and send the first coded transport block and the coded indication information to the network device. The first transport block includes the first data, and the indication information is used to indicate whether the terminal device sends the first BSR when the terminal device sends the first data. Correspondingly, the network device receives the first coded transport block and the coded indication information, decodes the coded indication to obtain the indication information, and processes the first coded transport block based on the indication information.

It should be understood that the terminal device reports the first BSR to the network device. The first BSR is used to indicate an amount of data that is in the buffer of the terminal device other than the first data and that remains to be sent, namely, the data amount of the to-be-transmitted data buffered in the buffer, so that after receiving the first BSR, the network device allocates a time-frequency resource to the terminal device based on the data amount reported by using the first BSR.

Optionally, before S210, when the first data arrives, the terminal device sends a resource request to the network device, and the resource request may be a dedicated scheduling request (SR) or a random access preamble sequence (physical random access channel, PRACH). After receiving the resource request, the network device allocates a time-frequency resource to the user equipment, and sends an uplink scheduling request to the terminal device.

In an optional embodiment, the terminal device may send the first coded transport block and the coded indication information to the network device by using a pre-allocated time-frequency resource.

In the data transmission method provided in this embodiment of this application, the indication information and the first data are carried in different transport blocks and are separately coded. Therefore, the network device only needs to decode the indication information to learn whether the terminal device sends the first BSR when the terminal device sends the first data, so as to reduce a communication delay.

Optionally, before S210, the terminal device may code a second transport block to obtain a second coded transport block, and send the second coded transport block to the network device. The second transport block includes the first data.

Optionally, the first data may be retransmitted data. Before S210, the terminal device may determine, based on a retransmission mechanism of the terminal device, to retransmit the first data, or the terminal device may retransmit the first data based on an indication of the network device. This is not limited in this embodiment of this application.

It should be understood that, when the terminal device sends the second coded transport block, it may be understood that the terminal device initially transmits the first data, and when the terminal device sends the second coded transport block, it may be understood that the terminal device retransmits the first data. The first transport block and the second transport block include at least the same first data.

Optionally, the second transport block further includes a second BSR. If the indication information is used to indicate that the terminal device sends the first BSR when the terminal device sends the first data, in other words, when the terminal device retransmits the first data, the data amount in the buffer of the terminal device increases, the terminal device needs to immediately report the data amount of the to-be-transmitted data currently buffered in the buffer.

Optionally, the indication information is further used to indicate that the second BSR is updated with the first BSR.

It should be understood that the terminal device may determine, based on QoS of the to-be-transmitted data in the buffer, whether a BSR in the buffer needs to be immediately reported. For example, for a data service for which a delay needs to be lower than 0.5 ms or a service for which a delay needs to be lower than n ms, the terminal device immediately reports a buffer status.

In the data transmission method provided in this embodiment of this application, if the indication information is used to indicate that the terminal device does not send the first BSR when the terminal device sends the first data, the network device can jointly decode the first coded transport block and the second coded transport block based on the indication information. If the indication information is used to indicate that the terminal device sends the first BSR when the terminal device sends the first data, the network device separately decodes the first coded transport block and the second coded transport block, so as to avoid a case in which the network device does not learn that the first coded transport block carries the first BSR, and jointly decodes the first coded transport block and the second coded transport block, and consequently a decoding failure is caused.

Optionally, the terminal device may use the indication information as control information, and send the indication information by using a control channel.

Optionally, the indication information and the first transport block may be coded by using a same modulation and coding scheme (MCS) or different modulation and coding schemes. This is not limited in this embodiment of this application.

In an optional embodiment, the terminal device and the network device may agree on an MCS for the first transport block and the indication information by using a protocol, or the network device may indicate an MCS to the terminal device by using higher layer signaling. This is not limited in this embodiment of this application.

Optionally, if the indication information is used to indicate that the terminal device sends the first BSR when the terminal device sends the first coded transport block, the terminal device further needs to send the first BSR to the network device.

In an optional embodiment, if the indication information is used to indicate that the terminal device does not send the first BSR when the terminal device sends the first data, the network device may jointly decode the first coded transport block and the second coded transport block based on the indication information, to obtain the first data.

In another optional embodiment, if the indication information indicates that the terminal device sends the first BSR, the network device may separately decode the first coded transport block and the second coded transport block based on the indication information.

Optionally, the terminal device may send the first coded transport block to the network device, and the first coded transport block includes the first BSR. Alternatively, the terminal device may send a third coded transport block to the network device, and the third coded transport block includes the first BSR. Alternatively, the terminal device may send the first BSR to the network device by using a control channel. This is not limited in this embodiment of this application.

In an optional embodiment, the terminal device may use the first BSR as control information, and send the first BSR by using a control channel.

In another optional embodiment, the terminal device may add the first BSR to a MAC CE of the first data, or may add the first BSR to the first N bits or the last N bits of a data packet payload of the first data. This is not limited in this embodiment of this application.

In still another optional embodiment, the terminal device may transmit, by using a third transport block, the first BSR that is used as data. This is not limited in this embodiment of this application.

It should be understood that the terminal device and the network device may make an agreement in advance: If the terminal device sends only the first BSR, a coded transport block first received by the network device carries the first data, and a coded transport block second received by the network device carries the first BSR; or a coded transport block first received by the network device carries the first BSR, and a coded transport block second received by the network device carries the first data. The terminal device and the network device may determine, based on a timestamp, a time sequence of receiving the two coded transport blocks. This is not limited in this embodiment of this application.

Optionally, the second terminal device may assign a same sequence number to the first coded transport block carrying the first data and the third coded transport block carrying the first BSR, and the network device determines, based on the same sequence number of the first coded transport block and the third coded transport block, that the first coded transport block and the third coded transport block are transmitted in a same round.

Optionally, the terminal device may send the first coded transport block and the coded indication information by using a time-frequency resource pre-allocated by the network device.

Optionally, when a data amount of the first BSR is relatively small, and is not enough to fill in uplink resources, the remaining uplink resources may be used to transmit the first data, to be specific, the terminal device may add a part of the first data to the third transport block together with the first BSR, and the first transport block and the third transport block jointly occupy a time-frequency resource indicated by an uplink scheduling grant or reserved in a grant-free manner.

For example, the uplink scheduling grant indicates that 10 physical resource blocks (PRBs) are allocated for current uplink transmission, and an MCS level 5 is used. The terminal device sends two coded transport blocks. A first coded transport block includes first data for which five PRBs are used, and an MCS level 8 is used. A second coded transport block includes a first BSR for which five PRBs are used, and an MCS level 1 is used. The network device first detects the first BSR, determines that the remaining uplink resources are five PRBs, and determine, with reference to a corresponding transport block size used during scheduling performed based on the uplink scheduling grant, an MCS level used for the first data, so as to detect the first data.

It should be understood that the first BSR sent by the terminal device affects allocation of a time-frequency resource by the network device to the terminal device. Therefore, when the terminal device codes the first BSR, reliability of the first BSR needs to be ensured.

In an optional embodiment, the first transport block and the third transport block may be coded by using different modulation and coding schemes MCSs, to be specific, the third transport block may be coded by using an MCS different from an MCS for the first transport block that is indicated by an uplink scheduling grant or predefined in a grant-free manner.

Optionally, an MCS for the first transport block and the third transport block may be agreed on by using a protocol, configured by the network device by using a higher layer, or independently selected by the terminal device. When the terminal device independently performs the selection, the network device needs to blindly detect an MCS used for a BSR.

For example, if the MCS indicated by the uplink scheduling grant or predefined in a grant-free manner is a low-density parity-check code (LDPC), the first transport block may be coded by using the predefined LDPC code, and the third transport block may be coded by using a polar code. This is not limited in this embodiment of this application.

Optionally, a difference between an MCS coding level of the first transport block and an MCS coding level of the third transport block may be agreed on by using a protocol, configured by the network device by using a higher layer, or independently selected by the terminal device. When the terminal device independently performs the selection, the network device needs to blindly detect an MCS level used for the first BSR.

For example, if an MCS level indicated by the uplink scheduling grant or predefined in a grant-free manner is m, and transmission reliability corresponding to the MCS level is 90%, the first transport block may use the MCS level m, and the third transport block may use an MCS level n, where n<m, so as to ensure that the first BSR has 1%, 0.1%, or higher reliability.

In another optional embodiment, the first transport block and the third transport block may be coded by using a same modulation and coding scheme MCS, to be specific, both the first transport block and the third transport block may be coded by using a first MCS indicated by an uplink scheduling grant or predefined in a grant-free manner.

In still another optional embodiment, the first coded transport block and the third coded transport block may be sent by using different transmit power, to be specific, the third coded transport block may be sent by using transmit power different from transmit power indicated by uplink scheduling grant or predefined in a grant-free manner.

Optionally, a difference between transmit power of the first coded transport block and transmit power of the third coded transport block may be agreed on by using a protocol, configured by the network device by using a higher layer, or independently selected by the terminal device. When the terminal device independently performs the selection, if a relatively low modulation scheme such as BPSK or QPSK is used for the BSR, the network device does not need to learn of transmit power of the third transport block, but may directly detect the first BSR. If a relatively high modulation scheme such as 16QAM or a higher scheme is used for the first BSR, the network device needs to blindly detect the first BSR.

For example, if the transmit power indicated by the uplink scheduling grant or predefined in a grant-free manner is m, and transmission reliability corresponding to the transmit power is 90%, the first transport block may use transmit power q, where p<q, so as to ensure that the first BSR has reliability of 1%, 0.1%, or higher.

It should be understood that the first coded transport block, the coded indication information, and the third coded transport block in this embodiment of this application may be simultaneously sent, or may be successively sent at a transmit interval less than a preset time threshold. This is not limited in this embodiment of this application.

In another optional embodiment, if the indication information indicates that the terminal device sends the first BSR, and the first BSR is carried on the first coded transport block, the network device processes the first coded transport block based on the indication information. Specifically, the network device may independently decode the first coded transport block based on the indication information, to obtain the first data and the first BSR.

Optionally, the network device may further receive the third coded transport block sent by the terminal device, and the third coded transport block includes the first BSR. The network device decodes the third coded transport block to obtain the first BSR.

If the terminal device sends a second coded transport block before sending the first coded transport block, both the first coded transport block and the second coded transport block include the first data, and the second coded transport block further includes a second BSR, the network device updates the second BSR with the first BSR after obtaining the first BSR, and allocates the time-frequency resource to the terminal device based on the first BSR.

In the data transmission method provided in this embodiment of this application, the network device may decode the coded indication information to learn whether the terminal device sends the first BSR when the terminal device sends the first data. Further, when the indication information is used to indicate that the first BSR is sent, the network device may decode the third coded transport block to obtain the first BSR (or the second BSR is updated with the first BSR), so as to allocate the time-frequency resource to the terminal device based on the first BSR, thereby reducing a communication delay.

Optionally, the terminal device may send the indication information to the network device, or the terminal device may determine, based on whether to send the first BSR, a manner of transmitting the first coded transport block, and send the first coded transport block to the network device based on the manner of transmitting the first coded transport block, to implicitly send the indication information to the network device. The indication information is used to indicate whether the terminal device sends the first BSR when the terminal device sends the first data.

Figure 3:
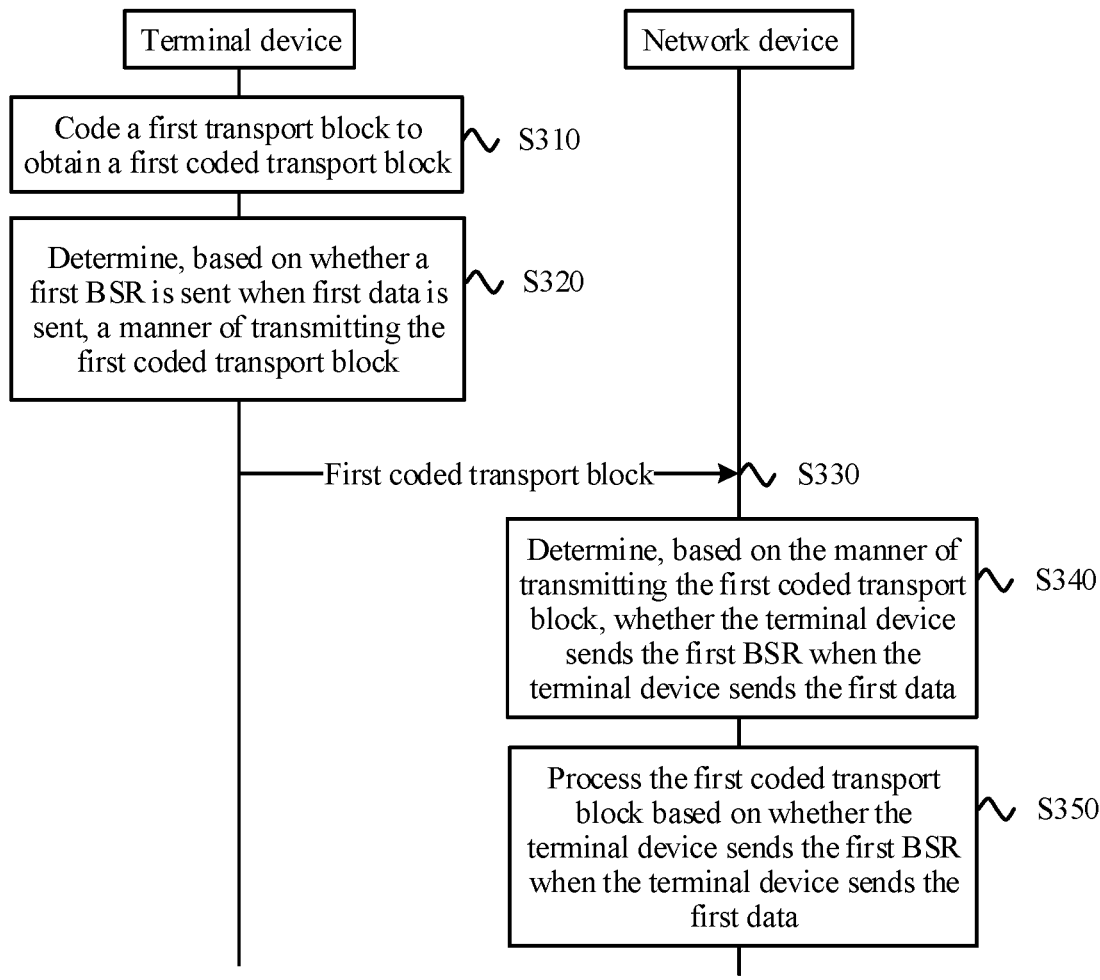
FIG. 3 is a schematic flowchart of another data transmission method according to an embodiment of this application.

In an optional embodiment, FIG. 3 is a schematic flowchart of another data transmission method 300 according to an embodiment of this application. The method 300 may be applied to the wireless communications system shown in FIG. 1.

S310. A terminal device codes a first transport block to obtain a first coded transport block, where the first transport block includes first data.

S320. The terminal device determines, based on whether a first buffer status report BSR is sent when the first data is sent, a manner of transmitting the first coded transport block, where the first BSR indicates a data amount of to-be-transmitted data currently buffered in a buffer of the terminal device.

S330. The terminal device sends the first coded transport block to the network device based on the transmission manner, and correspondingly, the network device receives the first coded transport block sent by the terminal device.

S340. The network device determines, based on the manner of transmitting the first coded transport block, whether the terminal device sends the first buffer status report BSR when the terminal device sends the first data, where the first BSR indicates the data amount of the to-be-transmitted data currently buffered in the buffer of the terminal device.

S350. The network device processes the first coded transport block based on whether the terminal device sends the first BSR when the terminal device sends the first data.

It should be understood that whether the terminal device sends the first BSR when the terminal device sends the first data is corresponding to different transmission manners used by the terminal device to transmit the first coded data block.

Optionally, the terminal device may determine, based on whether the first buffer status report BSR is sent when the first data is sent, a time-frequency resource used for the first coded transport block and/or a pilot sequence used for the first coded transport block. This is not limited in this embodiment of this application.

In an optional embodiment, the terminal device may determine, based on whether the first BSR is sent when the first data is sent, the time-frequency resource used for the first coded transport block.

In another optional embodiment, the terminal device may determine, based on whether the first BSR is sent when the first data is sent, the pilot sequence used for the first coded transport block.

Optionally, the network device may determine, based on the time-frequency resource used for the first coded transport block and/or the pilot sequence used for the first coded transport block, whether the terminal device sends the first BSR when the terminal device sends the first data. This is not limited in this embodiment of this application.

In an optional embodiment, that the network device determines, based on the manner of transmitting the first coded transport block, whether the terminal device sends the first buffer status report BSR when the terminal device sends the first data includes: The network device determines, based on a time-frequency resource used for the first coded transport block, whether the terminal device sends the first BSR when the terminal device sends the first data.

In another optional embodiment, that the network device determines, based on the manner of transmitting the first coded transport block, whether the terminal device sends the first buffer status report BSR when the terminal device sends the first data includes: The network device determines, based on a pilot sequence used for the first coded transport block, whether the terminal device sends the first BSR when the terminal device sends the first data.

Optionally, for grant-free transmission, the network device configures M resource pools reserved for grant-free transmission. If the terminal device sends the first coded transport block in p resource pools, it indicates that the terminal device sends the first BSR. If the terminal device sends the first coded transport block in q resource pools, it indicates that the terminal device does not send the first BSR, where p+q=M.

In an optional embodiment, if the terminal device determines not to send the first BSR, the terminal device may send the first coded transport block to the network device in one or more of the p resource pools. If the terminal device determines to send the first BSR, the terminal device may send the first coded transport block to the network device in one or more of the q resource pools.

Correspondingly, if the network device receives, in one or more of the p resource pools, the first coded transport block sent by the terminal device, the network device may determine that the terminal device sends the first BSR when the terminal device sends the first coded transport block. If the network device receives, in one or more of the q resource pools, the first coded transport block sent by the terminal device, the network device may determine that the terminal device does not send the first BSR when the terminal device sends the first coded transport block.

Optionally, an uplink reference signal used by the terminal device to send the first coded transport block may be a ZC sequence, and a root sequence of the ZC sequence is determined based on an identifier of the terminal device. A cyclic shift item a is corresponding to whether the first coded transport block includes buffer information, and a specific value of a may be agreed on by using a protocol, or configured by the network device for the terminal device by using higher layer signaling. The network device and the terminal device may pre-agree on a value of a used when the terminal device sends the first BSR and a value of a used when the terminal device does not send the first BSR.

In an optional embodiment, if a used when the terminal device sends the first coded transport block is equal to k, it indicates that the terminal device sends the first BSR. If a used when the terminal device sends the first coded transport block is equal to 1, it indicates that the terminal device does not send the first BSR, where k is not equal to 1.

Correspondingly, if the network device receives the first coded transport block, and determines that a used when the uplink reference signal for the first coded transport block is sent is equal to k, the network device determines that the terminal device sends the first data when the terminal device sends the first data. If the network device receives the first coded transport block, and determines that a used when the uplink reference signal for the first coded transport block is sent is equal to 1, the network device determines that the terminal device does not send the first data when the terminal device sends the first data.

Optionally, the uplink reference signal includes two parts, in other words, an entire sequence is divided into two segments having a same length. Therefore, if the terminal device uses a pilot sequence in which a first segment of the sequence and a second segment of the sequence are the same, it indicates that the terminal device sends the first BSR. If the terminal device uses a pilot sequence in which a first segment of the sequence and a second segment of the sequence are different, it indicates that the terminal device does not send the first BSR.

Correspondingly, the network device determines, by using a detected pilot sequence, whether the first coded transport block includes the first BSR.

Optionally, a phase shift value between the first segment of the sequence and the second segment of the sequence may be agreed on by using a protocol, or configured by the network device for the terminal device by using higher layer signaling.

In the data transmission method provided in this embodiment of this application, the terminal device may determine, based on whether the first BSR is sent when the first data is sent, the manner of transmitting the first coded transport block, and send the first coded transport block to the network device based on the transmission manner, so that the indication information can be implicitly sent to the network device without occupying the time-frequency resource allocated by the network device to the terminal device, thereby saving network resources.

The data transmission method according to the embodiments of this application is described above in detail with reference to FIG. 1 to FIG. 3. A data transmission apparatus according to the embodiments of this application is described below in detail with reference to FIG. 4 to FIG. 7.

Figure 4:
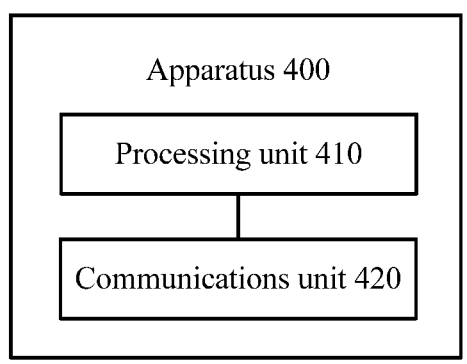
FIG. 4 is a schematic flowchart of a data transmission apparatus according to an embodiment of this application.

FIG. 4 shows a data transmission apparatus 400 according to an embodiment of this application. The apparatus 400 includes:

a processing unit 410, configured to: code a first transport block to obtain a first coded transport block, where the first transport block includes first data; code indication information to obtain coded indication information, where the indication information is used to indicate whether the terminal device sends a first buffer status report BSR when the terminal device sends the first data, and the first BSR indicates a data amount of to-be-transmitted data currently buffered in a buffer of the terminal device; and a communications unit 420, configured to send the first coded transport block and the coded indication information that are obtained by the processing unit to a network device.

Optionally, the processing unit is further configured to: before coding the first transport block to obtain the first coded transport block, process a second transport block to obtain a second coded transport block, where the second transport block includes the first data and a second BSR, and the second BSR indicates a data amount of to-be-transmitted data in the buffer when the terminal device sends the second coded transport block; and send the second coded transport block to the network device.

Optionally, the indication information is used to indicate that the terminal device sends the first BSR when the terminal device sends the first data, and the second BSR is updated with the first BSR.

Optionally, the indication information is used to indicate that the terminal device sends the first BSR when the terminal device sends the first data; the processing unit is further configured to code a third transport block to obtain a third coded transport block, where the third transport block includes the first BSR; and the communications unit is further configured to send the third coded transport block to the network device.

Optionally, the first transport block and the third transport block are coded by using different modulation and coding schemes.

Optionally, the communications unit is specifically configured to send the first coded transport block and the coded indication information to the network device on a time-frequency resource pre-allocated by the network device.

Optionally, the first transport block further includes the first BSR.

In an optional example, a person skilled in the art may understand that the apparatus 400 may be specifically the terminal device in the foregoing method embodiment. The apparatus 400 may be configured to perform the procedures and/or steps that are corresponding to the terminal device in the foregoing method embodiment. To avoid repetition, details are not described herein again.

It should be understood that the apparatus 400 herein may be embodied in a form of a function unit. The term "unit" herein may be an application-specific integrated circuit (ASIC), an electronic circuit, a processor (for example, a shared processor, a dedicated processor, or a group processor) and a memory that are configured to execute one or more software or firmware programs, a combined logic circuit, and/or another appropriate component supporting the described function.

Figure 5:
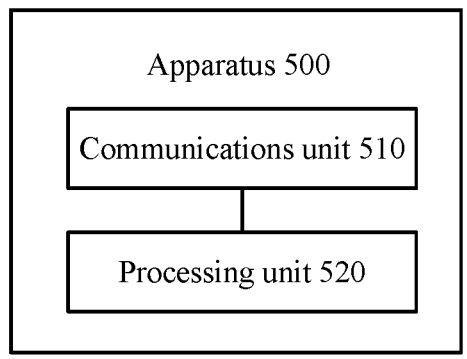
FIG. 5 is a schematic flowchart of another data transmission apparatus according to an embodiment of this application.

FIG. 5 shows a data transmission apparatus 500 according to an embodiment of this application. The apparatus 500 includes:

a communications unit 510, configured to receive a first coded transport block and coded indication information that are sent by a terminal device, where the first coded transport block includes first data; and a processing unit 520, configured to: decode the coded indication information to obtain indication information, where the indication information is used to indicate whether the terminal device sends a first buffer status report BSR when the terminal device sends the first data, and the first BSR indicates a data amount of to-be-transmitted data currently buffered in a buffer of the terminal device; and process the first coded transport block based on the indication information.

Optionally, the communications unit is further configured to: before the network device receives the first coded transport block and the coded indication information that are sent by the terminal device, receive a second coded transport block sent by the terminal device, where the second coded transport block includes the first data and a second BSR, and the second BSR indicates a data amount of to-be-transmitted data in the buffer when the terminal device sends the second coded transport block.

Optionally, the indication information is used to indicate that the terminal device sends the first BSR when the terminal device sends the first data and that the second BSR is updated with the first BSR; and the processing unit is further configured to update the second BSR with the first BSR.

Optionally, the indication information is used to indicate that the terminal device sends the first BSR when the terminal device sends the first data; the communications unit is further configured to receive a third coded transport block sent by the terminal device; and the processing unit is further configured to decode the third coded transport block to obtain the first BSR.

Optionally, the first coded transport block and the third coded transport block are separately decoded.

Optionally, the communications unit is specifically configured to receive the third coded transport block on a time-frequency resource pre-allocated to the terminal device.

Optionally, the indication information is used to indicate that the terminal device sends the first BSR when the terminal device sends the first data; and the processing unit is specifically configured to separately decode the first coded transport block and the second coded transport block based on the indication information.

Optionally, the indication information is used to indicate that the terminal device does not send the first BSR when the terminal device sends the first data; and the processing unit is specifically configured to jointly decode the first coded transport block and the second coded transport block based on the indication information.

In an optional example, a person skilled in the art may understand that the apparatus 500 may be specifically the network device in the foregoing method embodiment. The apparatus 500 may be configured to perform the procedures and/or steps that are corresponding to the network device in the foregoing method embodiment. To avoid repetition, details are not described herein again.

It should be understood that the apparatus 500 herein may be embodied in a form of a function unit. The term "unit" herein may be an application-specific integrated circuit (ASIC), an electronic circuit, a processor (for example, a shared processor, a dedicated processor, or a group processor) and a memory that are configured to execute one or more software or firmware programs, a combined logic circuit, and/or another appropriate component supporting the described function.

Figure 6:
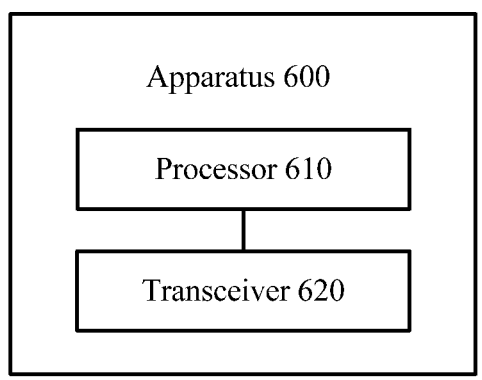
FIG. 6 is a schematic flowchart of still another data transmission apparatus according to an embodiment of this application.

FIG. 6 is a schematic block diagram of a data transmission apparatus 600 according to an embodiment of this application. As shown in FIG. 6, the apparatus 600 includes a processor 610 and a transceiver 620.

The processor 610 is configured to: code a first transport block to obtain a first coded transport block, where the first transport block includes first data; code indication information to obtain coded indication information, where the indication information is used to indicate whether the terminal device sends a first buffer status report BSR when the terminal device sends the first data, and the first BSR indicates a data amount of to-be-transmitted data currently buffered in a buffer of the terminal device.

The transceiver 620 is configured to send the first coded transport block and the coded indication information to a network device.

Optionally, the apparatus 600 may further include a memory. The memory may include a read-only memory and a random access memory, and provide an instruction and data to the processor. A part of the memory may further include a non-volatile random access memory. For example, the memory may further store information about a device type. The processor 610 may be configured to execute the instruction stored in the memory, and when the processor executes the instruction, the processor may perform the steps corresponding to the terminal device in the foregoing method embodiment.

It should be understood that in this embodiment of this application, the processor may be a central processing unit (CPU), or the processor may be another general-purpose processor, a digital signal processor (DSP), an application-specific integrated circuit ASIC, a field programmable gate array (FPGA) or another programmable logic device, a discrete gate or a transistor logic device, a discrete hardware component, or the like. The general-purpose processor may be a microprocessor, the processor may be any conventional processor, or the like.

Figure 7:
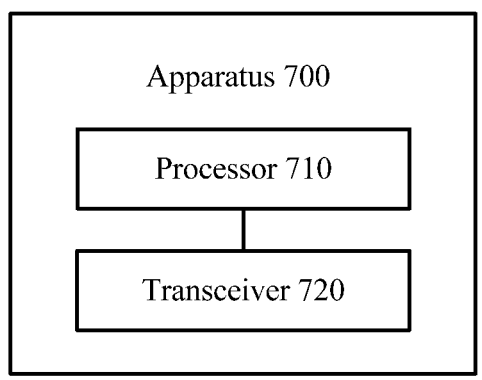
FIG. 7 is a schematic flowchart of yet another data transmission apparatus according to an embodiment of this application.

FIG. 7 is a schematic block diagram of an information transmission apparatus 700 according to an embodiment of this application. As shown in FIG. 7, the apparatus 700 includes a processor 710 and a transceiver 720.

The transceiver 720 is configured to receive a first coded transport block and coded indication information that are sent by a terminal device, where the first coded transport block includes first data.

The processor 710 is configured to: decode the coded indication information to obtain indication information, where the indication information is used to indicate whether the terminal device sends a first buffer status report BSR when the terminal device sends the first data, and the first BSR indicates a data amount of to-be-transmitted data currently buffered in a buffer of the terminal device; and process the first coded transport block based on the indication information.

Optionally, the apparatus 700 may further include a memory. The memory may include a read-only memory and a random access memory, and provide an instruction and data to the processor. A part of the memory may further include a non-volatile random access memory. For example, the memory may further store information about a device type. The processor 710 may be configured to execute the instruction stored in the memory, and when the processor executes the instruction, the processor may perform the steps corresponding to the network device in the foregoing method embodiment.

It should be understood that in this embodiment of this application, the processor may be a central processing unit (CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, the processor may be any conventional processor, or the like.

In an implementation process, steps in the foregoing methods can be implemented by using an integrated logic circuit of hardware in the processor, or by using instructions in a form of software. The steps of the methods disclosed with reference to the embodiments of this application may be directly performed by a hardware processor, or may be performed by using a combination of a hardware module and a software module in the processor. The software module may be located in a mature storage medium in the art, such as a random access memory, a flash memory, a read-only memory, a programmable read-only memory, an electrically erasable programmable memory, or a register. The storage medium is located in the memory, and the processor executes the instruction in the memory and completes the steps in the foregoing methods in combination with the hardware of the processor. To avoid repetition, details are not described herein again.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in the various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by using of software, hardware, firmware, or any combination thereof. When the software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD), a semiconductor medium (for example, a solid state disk (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
   coding and modulating, by a terminal device, a first transport block to obtain a first coded transport block for transmission in a transmission time interval being a minimum scheduling period, the first transport block comprising a buffer status report (BSR) indicating an amount of to-be-transmitted data currently buffered in a buffer of the terminal device;
   sending, by the terminal device, the first coded transport block comprising the BSR to a network device;
   separately coding and modulating, by the terminal device, indication information to obtain a different coded transport block comprising the indication information, the indication information being used to indicate that the terminal device sends the BSR when the terminal device sends the first coded transport block; and
   sending, by the terminal device, the different coded transport block comprising the indication information to the network device.

2. The method according to claim 1, wherein the indication information is used to indicate that the terminal device sends the BSR when the terminal device sends the data, and the method further comprises:
   coding and modulating, by the terminal device, a third transport block to obtain a third coded transport block, the third transport block also comprising the BSR; and
   sending, by the terminal device, the third coded transport block to the network device.

3. The method according to claim 2, wherein the first transport block and the third transport block are coded by using different modulation and coding schemes.

4. The method according to claim 2, wherein the sending, by the terminal device, the first coded transport block comprising the BSR and the different coded transport block comprising the indication information to the network device comprises:
   sending, by the terminal device, the first coded transport block comprising the BSR and the different coded transport block comprising the indication information to the network device on a time-frequency resource pre-allocated by the network device.

5. The method according to claim 1, wherein the first transport block further comprises the data.

6. A data transmission method, comprising:
   receiving, by a network device, a first coded transport block in a transmission time interval being a minimum scheduling period from a terminal device, the first coded transport block comprising a buffer status report (BSR) indicating an amount of to-be-transmitted data currently buffered in a buffer of the terminal device;
   decoding and demodulating, by the network device, the first coded transport block to obtain the BSR;
   receiving, by the network device, a different coded transport block from the terminal device, the different coded transport block comprising indication information used to indicate that the terminal device sends the BSR when the terminal device sends the first coded transport block; and
   separately decoding and demodulating, by the network device, the different coded transport block to obtain the indication information.

7. The method according to claim 6, wherein the indication information is used to indicate that the terminal device sends the BSR when the terminal device sends the data, and the method further comprises:
   receiving, by the network device, a third coded transport block from the terminal device; and
   decoding and demodulating, by the network device, the third coded transport block to obtain a third transport block, the third transport block also comprising the BSR.

8. The method according to claim 7, wherein the first coded transport block and the third coded transport block are decoded and demodulated using different demodulation and decoding schemes.

9. The method according to claim 7, wherein the receiving the first coded transport block comprising the BSR and the different coded transport block comprising the indication information comprises:
   receiving, by the network device, the first coded transport block comprising the BSR and the different coded transport block comprising the indication information on a time-frequency resource pre-allocated by the network device.

10. The method according to claim 6, wherein the first coded transport block further comprises the data.

11. A terminal device, comprising:
    a processor, configured to:
      code and modulate a first transport block to obtain a first coded transport block for transmission in a transmission time interval being a minimum scheduling period, wherein the first transport block comprises a buffer status report (BSR) indicating an amount of to-be-transmitted data currently buffered in a buffer of the terminal device;
      separately code and modulate indication information to obtain a different coded transport block comprising the indication information, wherein the indication information is used to indicate that the terminal device sends the BSR when the terminal device sends the first coded transport block; and
    a transceiver, configured to:

send the first coded transport block comprising the BSR to a network device; and send the different coded transport block comprising the indication information to the network device.

12. The terminal device according to claim 11, wherein:

the indication information is used to indicate that the terminal device sends the BSR when the terminal device sends the data;

the processor is further configured to code and modulate a third transport block to obtain a third coded transport block, wherein the third transport block also comprises the BSR; and the transceiver is further configured to send the third coded transport block to the network device.

13. The terminal device according to claim 12, wherein the first transport block and the third transport block are coded by using different modulation and coding schemes.

14. The terminal device according to claim 12, wherein the transceiver is configured to send the first coded transport block comprising the BSR and the different coded transport block comprising the indication information to the network device on a time-frequency resource pre-allocated by the network device.

15. The terminal device according to claim 11, wherein the first transport block further comprises the BSR.

* * * * *